(12) United States Patent
Bedrosian

(10) Patent No.: US 7,773,505 B2
(45) Date of Patent: Aug. 10, 2010

(54) METHOD AND SYSTEM FOR GENERATING PACKET DELAY VARIATION WITH A UNIFORM DISTRIBUTION

(75) Inventor: Paul Stephan Bedrosian, Andover, MA (US)

(73) Assignee: Agere Systems Inc., Allentown, PA (US)

( * ) Notice: Subject to any disclaimer, the term of this patent is extended or adjusted under 35 U.S.C. 154(b) by 196 days.

(21) Appl. No.: 12/074,031

(22) Filed: Feb. 29, 2008

(65) Prior Publication Data

US 2008/0225746 A1 Sep. 18, 2008

Related U.S. Application Data

(60) Provisional application No. 60/904,646, filed on Mar. 2, 2007.

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)

(52) U.S. Cl. ........................ 370/229; 370/252
(58) Field of Classification Search .......... 370/229, 370/230.1, 235, 252, 392, 395.62; 375/316; 382/251

See application file for complete search history.

(56) References Cited

U.S. PATENT DOCUMENTS

| | | |
|---|---|---|
| 6,442,166 B1 | 8/2002 | McDonald et al. |
| 6,571,358 B1 | 5/2003 | Culotta et al. |
| 6,937,603 B1 * | 8/2005 | Miao ............ 370/395.62 |
| 7,191,355 B1 | 3/2007 | Ouellette et al. |
| 7,418,147 B2 * | 8/2008 | Kamaci et al. ........... 382/251 |
| 7,492,732 B2 | 2/2009 | Aweya et al. |
| 2003/0091047 A1 * | 5/2003 | Pate et al. ................. 370/392 |
| 2006/0165003 A1 | 7/2006 | Partridge |
| 2006/0193400 A1 * | 8/2006 | Morris et al. .............. 375/316 |
| 2008/0080563 A1 | 4/2008 | Kataria et al. |
| 2008/0262991 A1 | 10/2008 | Kapoor et al. |
| 2009/0268783 A1 | 10/2009 | Karabinis |

OTHER PUBLICATIONS

"Timing and Synchronization Aspects in Packet Networks", ITU-T Recommendation G.8261/Y.1361 (May 2006).
"Ethernet Network Emulators: GEM,XGEM", High Performance Precision Emulators, Anue Systems, Inc. (Nov. 2007).
S. Kaczmarek, et al., "Methods for Evaluation Packet Delay Distribution of Flows Using Expedited Forwarding PHB", Journal of Telecomm. & Information Technology (Feb. 2004).

* cited by examiner

*Primary Examiner*—Kevin C Harper
*Assistant Examiner*—Leon Andrews

(57) ABSTRACT

Embodiments of the present invention provide packet timing recovery stress testing by generating packet delay variation (PDV) with a uniformly distributed probability density function (PDF). A delay-step method determines a delay for each packet in a stream of packets generated at a regular interval. In the delay-step method, delay-steps are determined for each packet based on delay target values. To generate PDV with a uniform PDF, the delay target values are randomly selected based on a pre-biased PDF which is a uniform distribution that is pre-biased by a pre-bias function. The pre-bias function increases the values of small delay target values so that an increased number of delay target values are at the extremes of the uniform distribution, which causes the delay-step method to result in a PDV with a uniform distribution.

27 Claims, 18 Drawing Sheets

PDF DISTRIBUTION

US 7,773,505 B2

METHOD AND SYSTEM FOR GENERATING PACKET DELAY VARIATION WITH A UNIFORM DISTRIBUTION

This application claims the benefit of U.S. Provisional Application No. 60/904,646, filed Mar. 2, 2007, the disclosure of which is herein incorporated by reference.

BACKGROUND OF THE INVENTION

The present invention relates generally to simulating data packet networks, and more particularly to simulating packet delay variation (PDV) in data packet networks for adaptive packet timing recovery stress testing.

An ongoing development in telecommunications is the convergence of voice, video, and data into a common stream. This requires migrating services typically delivered using a circuit network, such as telephony, to a packet based network. However, in a packet based network, synchronization of such services is difficult because there is no longer a precise network clock traceable signal as in a circuit switched network. The network traceable clock is used to recover the service clock of these circuit switched services (e.g., DS1, E1) to ensure error free-transmission. Circuit switched networks rely on the physical layer to transport these network clock signals between network elements to form a timing chain. The accuracy of these physical layer clock signals are typically synchronized to an accuracy of ±4.6 ppm or better. However, in packet networks, the clock signals used at the physical layer do not form a timing chain but are controlled by local free-running oscillators. Further, the accuracy of physical layer transport clock is synchronized to an accuracy of ±100 ppm Therefore, the physical layer clock signals in a packet network are not sufficient to support the error-free transport of circuit switched services over a packet network, commonly called circuit emulation. As a result, other methods must be used to recovery the service clock of circuit emulation services. The method of adaptive timing recovery typically relies on the arrival characteristics of packets as a basis to create a suitable service clock for circuit emulation.

It is well known that adaptive timing methods are sensitive to packet delay variation (PDV) in packet based networks. Accordingly, there has been an effort to take PDV into account when performing timing recovery stress testing for determining performance requirements and testing equipment for use in a packet based network. The current methodology for generating PDV is to inject background traffic with various mixes of packet sizes into a connection-oriented series of packet switches. The packet traffic of interest (PTI) then establishes a path through these switches and experiences delays and delay variation on a switch-by-switch basis. The PDV can be measured as the PTI is received after being transmitted through the packet switches. However, the current methodology is not deterministic or repeatable, since different equipment used to conduct tests can lead to different results. The current methodology cannot control metrics used to model the PDV of real-world networks, such as peak-to-peak variation, packet-to-packet variation, histogram probability density, and statistical specifications, such as mean, mode, and standard deviation. Accordingly, a method for generating PDV that can simulate the PDV of a real world network and provide uniform testing is desirable. This capability is needed for a variety of reasons including the creation of standardized testing methods needed to verify compliance with interface requirements for circuit emulation services.

Furthermore, current methodology for packet timing recovery stress testing is based on Gaussian probability density functions (PDFs). The use of Gaussian distributions favors connection-oriented packet networks where packets flow along the same path and intermediate switches. In connectionless networks, packets traverse different routes, and therefore, will experience a broader range of delays than a simple Gaussian distribution. Accordingly, since Gaussian PDFs infrequently exercise the full delay variation range, they may not be suitable for stress testing adaptive packet timing recovery systems.

BRIEF SUMMARY OF THE INVENTION

The present invention provides a method and system for generating packet delay variation (PDV) with a uniformly distributed probability density function (PDF) for packet timing recovery stress testing. According to embodiments of the present invention, a delay-step method is used for deterministically delaying packets based on a probability distribution function (PDF) which is pre-biased by an N root square filter in order to result in PDV having a uniform distribution.

In one embodiment of the present invention a stream of packets is received. The stream of packets is generated by generating the packets at regular intervals. A delay-step method determines a delay for each packet in the stream of packets. In the delay-step method, delay-steps are determined for each packet based on delay target values. In order to generate PDV with a uniform PDF, the delay target values are randomly selected based on a pre-biased PDF which is a uniform distribution that is pre-biased by a pre-bias function. The pre-bias function increase the values of small delay target values so that an increased number of delay target values are at the extremes of the uniform distribution. For each delay target value, a series of sequential packets are adjusted by delay-steps determined based on the delay target value. The delay-steps can have variable or fixed sizes. Each packet in the stream of packets is transmitted with the delay determined for that packet.

These and other advantages of the invention will be apparent to those of ordinary skill in the art by reference to the following detailed description and the accompanying drawings.

BRIEF DESCRIPTION OF THE DRAWINGS

FIGS. 18 and 19 illustrate derivative PDV using variable delay-steps based on pre-biased delay target values for.

DETAILED DESCRIPTION

Packet delay variation (PDV) over a significant number of packet delay measurements can be described as having a Gaussian or normal distribution. This practice stems from the central limit theory that states that the distribution of a large number of samples tends to follow a normal distribution. Based on these assumptions, it has been common practice to evaluate packet timing systems using PDV based on a Gaussian probability density function (PDF). However, modeling PDV with a Gaussian distribution may not be best suited for stress testing adaptive timing recovery applications for connectionless networks. This is due to the fact that Gaussian PDFs tend to have the majority of values within one standard deviation of the mean. This means that few of the values at the extremes of the distribution (less than 5%) actually get tested over a given time interval. For stress testing, all values including the extreme values of a range of interest need to be tested appropriately. Therefore, embodiments of the present invention generate PDV having a uniformly distributed PDF.

Figure 1:
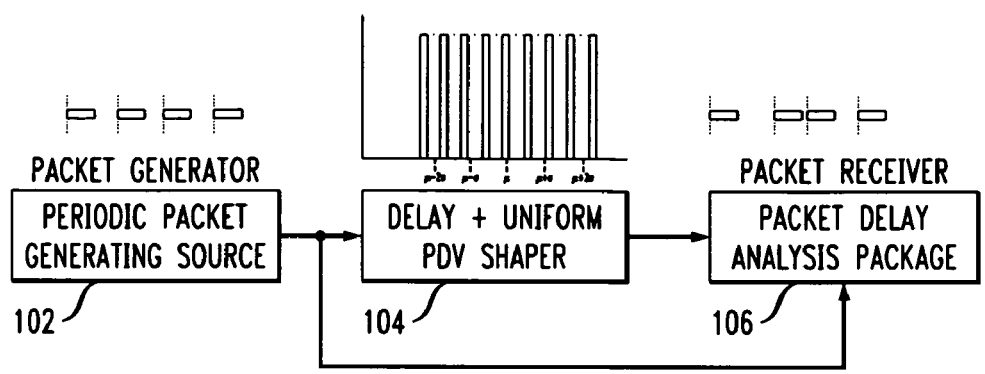
FIG. 1 illustrates a packet delay variation (PDV) simulator according to an embodiment of the present invention.

In order to illustrate the concept of a PDV having a uniformly distributed PDF, PDV is generated on packet traffic of interest (PTI), and then analysis is performed to determine whether the resulting PDV is uniformly distributed. FIG. 1 illustrates a PDV simulator according to an embodiment of the present invention. The PDV simulator can be implemented as an application executed by a processor on a computer system. For example, the PDV simulator can be implemented as a Microsoft Excel application, but the present invention is not limited thereto. The PDV simulator generates a user-defined delay profile for packets occurring at regular (periodic) intervals. The user defined profile for the PDV simulator of FIG. 1 has a uniform PDF. According to an embodiment of the present invention which is described in greater detail below, the uniform PDF used as the profile can be pre-biased by a pre-bias transfer function. As illustrated in FIG. 1, the PDV simulator includes a packet generator 102, which is a periodic packet generating source, a PDV generator 104, which shapes the PDV using a uniform PDF, and a packet receiver 106, which includes a packet delay analysis package.

The packet generator 102 generates packets at regular (periodic) intervals. Each packet is time-stamped with the time $(T_s)$ that the packet was sent. As they are generated, the packets are sent out to the PDV generator 104 and the packet receiver 106. The PDV generator 104 determines the delay and delay variation for each packet and transmits each packet with the corresponding delay to the packet receiver 106. The PDV generator 104 controls the delay and the delay variation of each packet independently. The delay variation is modeled as a uniformly distributed PDF. The uniform PDF can have selectable minimum and maximum PDV and selectable minimum and maximum delay step sizes, so that the distribution can be controlled by a user to model the distribution to accurately reflect a desired range of PDV. The PDV generator 104 determines the packet delay by calculating a target delay based on the uniform PDF and a delay-step size based on the target delay. The delay-step may be either fixed or variable with a uniform PDF.

The PDV generator 104 produces random delay values that fit a uniform PDF, using the following equations:

$$D_p(t) = (0.5 + 0.5 \times U_i(t)) \times (D_{MAX} - D_{MIN})$$

$$D_{total}(t) = D_{fixed} + D_p(t)$$

where $D_p(t)$ is the packet delay due to a random uniform PDF, $D_{fixed}$ is a fixed packet delay, $D_{Total}(t)$ is the total delay experienced by the packet, $D_{MAX}$ is the maximum delay variation, $D_{MIN}$ is the minimum delay variation, and $U_i(t)$ is a random number generator between −1 and 1 with a uniform PDF.

Each packet received at the packet receiver 106 from the PDV generator 104 is time-stamped with the time $(T_r)$ at which the packet is received. The packet receiver 106 calculates and plots the total packet delay $(T_r - T_s)$ of each packet. The delay variation (PDV) of a fixed sample (for example, 30,000 packets) can be calculated and plotted as a histogram. The packet delay analysis package of the packet receiver 106 may also further analyze various trends of the received PDV. For example, the packet receiver can calculate the mean, mode, peak-peak variation, or plot other statistical performance metrics including PDV derivative, TDEV or minTDEV.

Figure 2:
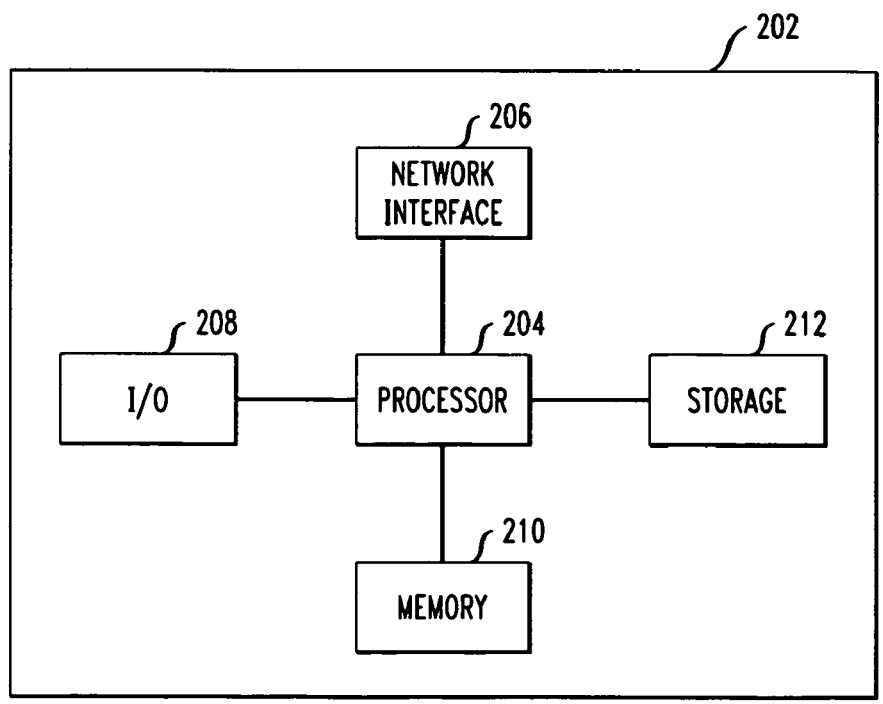
FIG. 2 illustrates a high level block diagram of a computer capable of implementing embodiments of the present invention.

The PDV simulator of FIG. 1 and the steps of the method of FIG. 11 (described below) may be performed by computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Thus, the operation of computer 202 is defined by computer program instructions stored in memory 210 and/or storage 212 and the computer 202 will be controlled by processor 204 executing the computer program instructions. Accordingly, computer program instructions for implementing a PDV simulator application, such as the PDV simulator of FIG. 1, can be stored in memory 210 and/or storage 212 and executed by processor 204 executing the computer program instructions. Also, computer program instructions for performing the steps of the method of FIG. 11 can be stored in memory 210 and/or storage 212 and executed by processor 204 executing the computer program instructions. Computer 202 also includes one or more network interfaces 206 for communicating with other devices via a network. Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. One skilled in the art will also recognize that the functionality described herein may be implemented using hardware, software, and various combinations of hardware and software.

In order to generate delays for the packets based on the uniform PDF, the PDV generator 104 selects a random uniformly distributed delay target value based on the uniform PDF. The PDV generator 104 then adjusts the delays of a subsequent series of packets in defined delay-steps until the actual packet delay of a packet is equal to the delay target value. The PDV generator then selects a new random delay target value based on the uniform PDF, and the process is repeated.

The delay-step is an adjustment to a current delay value in order to change the current delay value in a direction towards the delay target value. According to various possible implementations, the delay-step for each packet can be calculated using a variable step size or a fixed step size.

According to the variable delay-step size implementation, the delay-step is calculated as a random uniformly distributed value between minimum and maximum step sizes, $D_{step_{MIN}}$ and $D_{step_{MAX}}$, respectively, where $D_{step_{MIN}}$ is negative and $D_{step_{MAX}}$ is positive. If the difference between the current delay and the delay target value is negative (i.e., the delay target value is larger than the current delay), then the step size value is between 0 and $D_{step_{MAX}}$. Otherwise (i.e., if the delay target value is less than the current delay), the step size value is between $D_{step_{MIN}}$ and 0. The step size may be restricted from being larger (in either positive or negative directions) than a step size that will adjust the current delay to match the target delay.

According to the fixed delay-step size implementation, the delay-step is determined to be equal to either $D_{step_{MIN}}$ or $D_{step_{MAX}}$. If the difference between the current delay and the delay target value is negative (i.e., the delay target value is larger than the current delay), then the step size value is $D_{step_{MAX}}$. Otherwise (i.e., if the delay target value is less than the current delay), the step size value is $D_{step_{MIN}}$. In this implementation, when the fixed step size would overshoot the delay target value, then the step size required to adjust the current delay to match the delay target value is used instead of $D_{step_{MIN}}$ or $D_{step_{MAX}}$.

Figure 3:
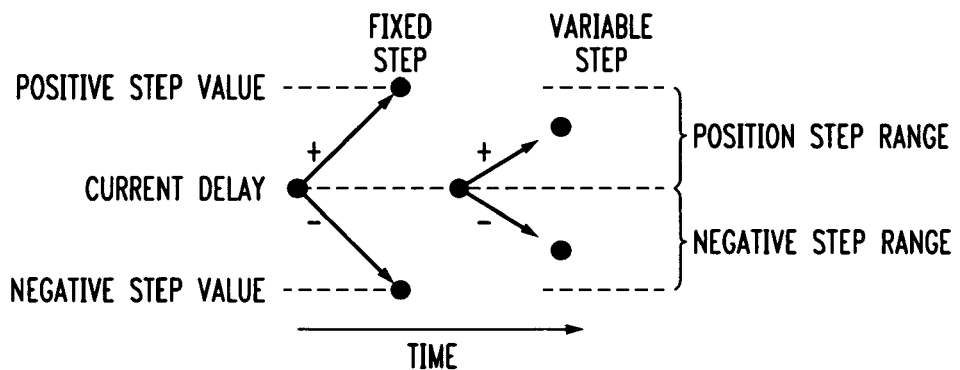
FIG. 3 illustrates delay-steps calculated using fixed and variable delay-step sizes.

FIG. 3 illustrates delay-steps calculated using fixed and variable delay-step sizes. As illustrated in FIG. 3, for fixed delay-steps, a step-size of either a fixed positive step value ($D_{step_{MAX}}$) or a fixed negative step value ($D_{step_{MIN}}$) is used to adjust the current delay, whereas for variable delay-steps, a step within a positive step range (between 0 and $D_{step_{MAX}}$) or within a negative step range (between $D_{step_{MIN}}$ and 0) is used to adjust the current delay.

Figure 4:
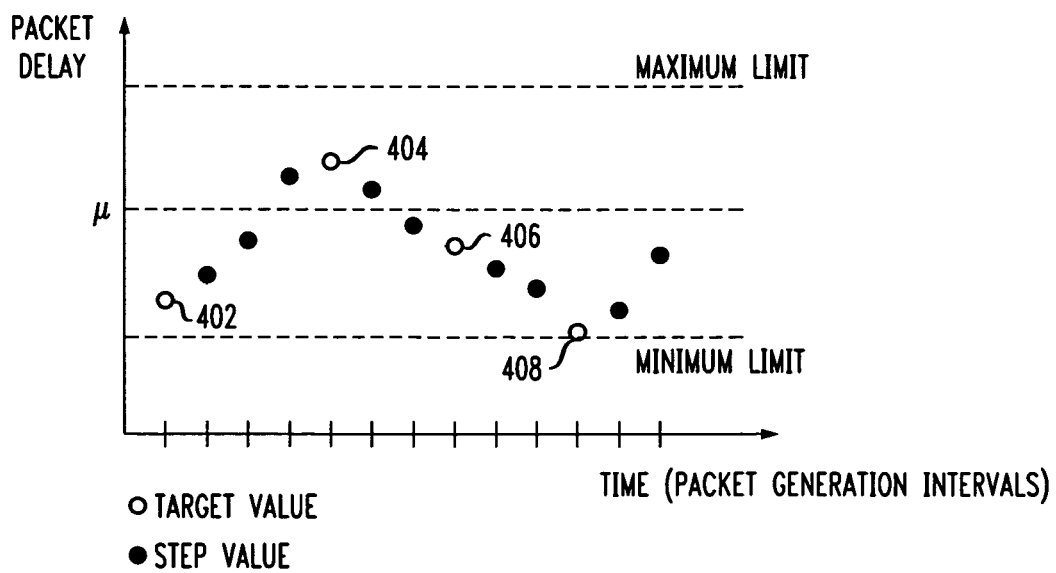
FIG. 4 illustrates repeatedly determining random delay target values and applying delay-steps to reach the delay target values.

Once the delay-steps are determined for each of the packets based on the delay target values, the delay-steps are added at specific intervals to the current delay to simulate the packet arrivals. FIG. 4 illustrates repeatedly determining random delay target values and applying delay-steps to reach the delay target values. As illustrated in FIG. 4, µ is the mean of the uniform PDF, and the maximum and minimum limits for the packet delay correspond to $D_{MIN}$ and $D_{MAX}$ described above. Delay target values 402, 404, 406, and 408 are determined and various delay-steps are used to reach the delay target values 402, 404, 406, and 408.

The packet delay values can be analyzed using a 400 point histogram graph. The resolution of the histogram is related to the PDV range by the following equation:

$$PDV\_Resolution = \frac{D_{MAX} - D_{MIN}}{400}.$$

The derivative of the PDV can also be calculated and analyzed. The derivative PDV can be calculated using the following equation:

$$D\_PDV(t) = \frac{D_p(t) - D_p(t-1)}{\tau},$$

where τ is the packet generation period. The derivative PDV values can then be analyzed by using a 400 point histogram graph. The resolution of the histogram is related to the derivative PDV range by the following equation:

$$D\_PDV\_Resolution = \frac{D\_PDV_{MAX} - D\_PDV_{MIN}}{400}.$$

Although the values of the derivative PDV are presented as a histogram, they can also be presented and analyzed in various other formats as well.

FIGS. 5-8 illustrate PDV simulation results of a PDV simulation using a uniformly distributed PDF target as described above with variable and fixed delay-step sizes. These results are for a PDV simulation using the following parameters:

$D_{MAX}$=30 ms
$D_{MIN}$=10 ms
$D_{step_{MAX}}$=100 µs
$D_{step_{MIN}}$=−100 µs
Packet Generation Rate=1000/sec.

Figure 5:
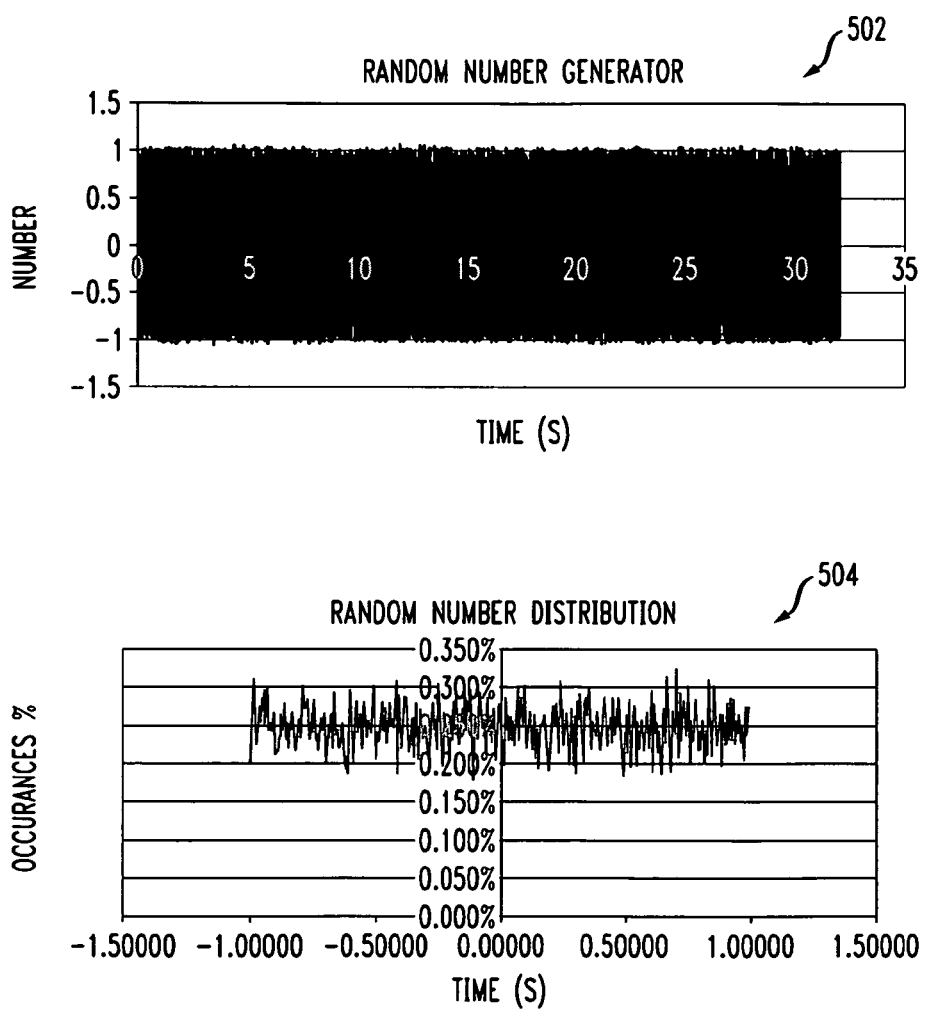
FIG. 5 illustrates random number generation used in PDV simulation.

FIG. 5 illustrates random number generation used in the PDV simulation. Graph 502 shows a plot of the random number generator $U_i(t)$ over time, and graph 504 shows a histogram of the PDF of the random number generator $U_i(t)$. As shown in 502 and 504, PDF distribution of the random number generator $U_i(t)$ is relatively uniform between −1 and 1.

Figure 6:
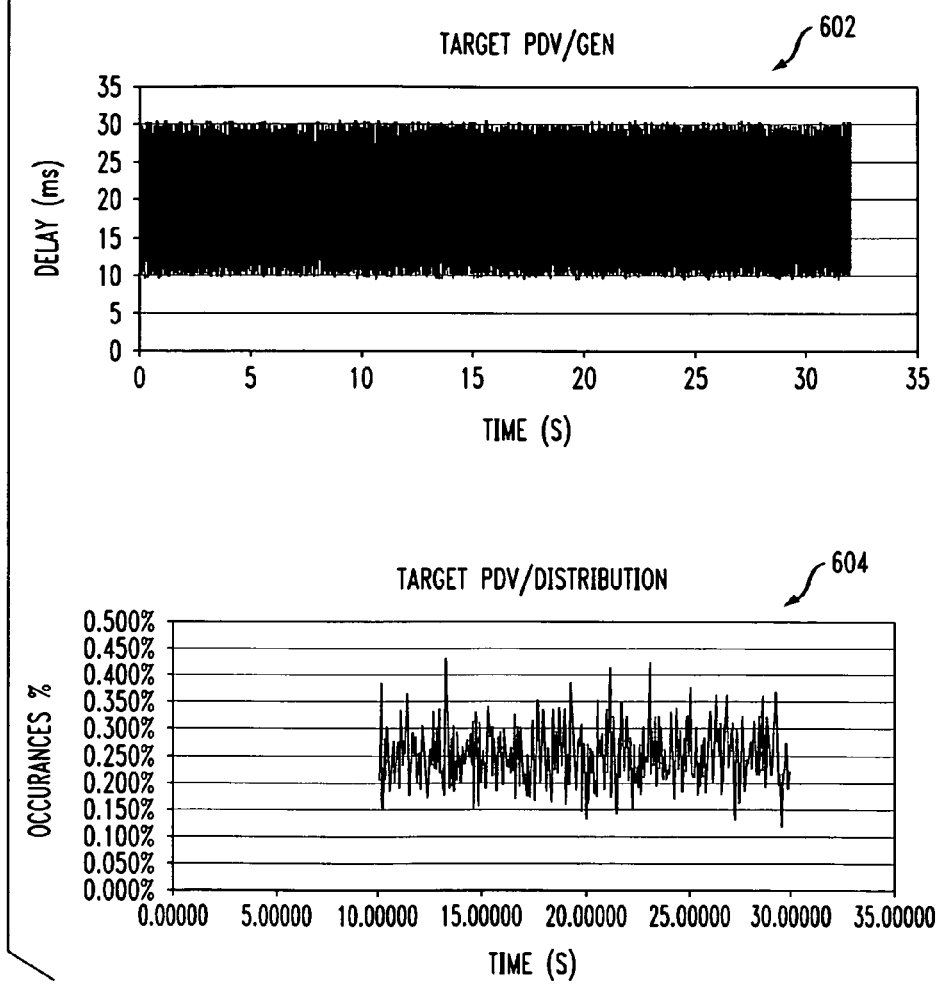
FIG. 6 illustrates uniform PDV delay target generation.

FIG. 6 illustrates uniform PDV delay target generation. Graph 602 shows the random uniform PDV delay targets displayed over time, and graph 604 shows a PDF histogram for the random delay target distribution. As illustrated in graphs 602 and 604, because of the short time duration of the simulation, the target distribution reflects a relatively uniform occurrence of all delay values. This distribution forms the basis of the actual delay targets selected in the delay-step process. Accordingly, it may be expected that the output PDF resulting from the delay-step process will reflect this uniformity.

Figure 7:
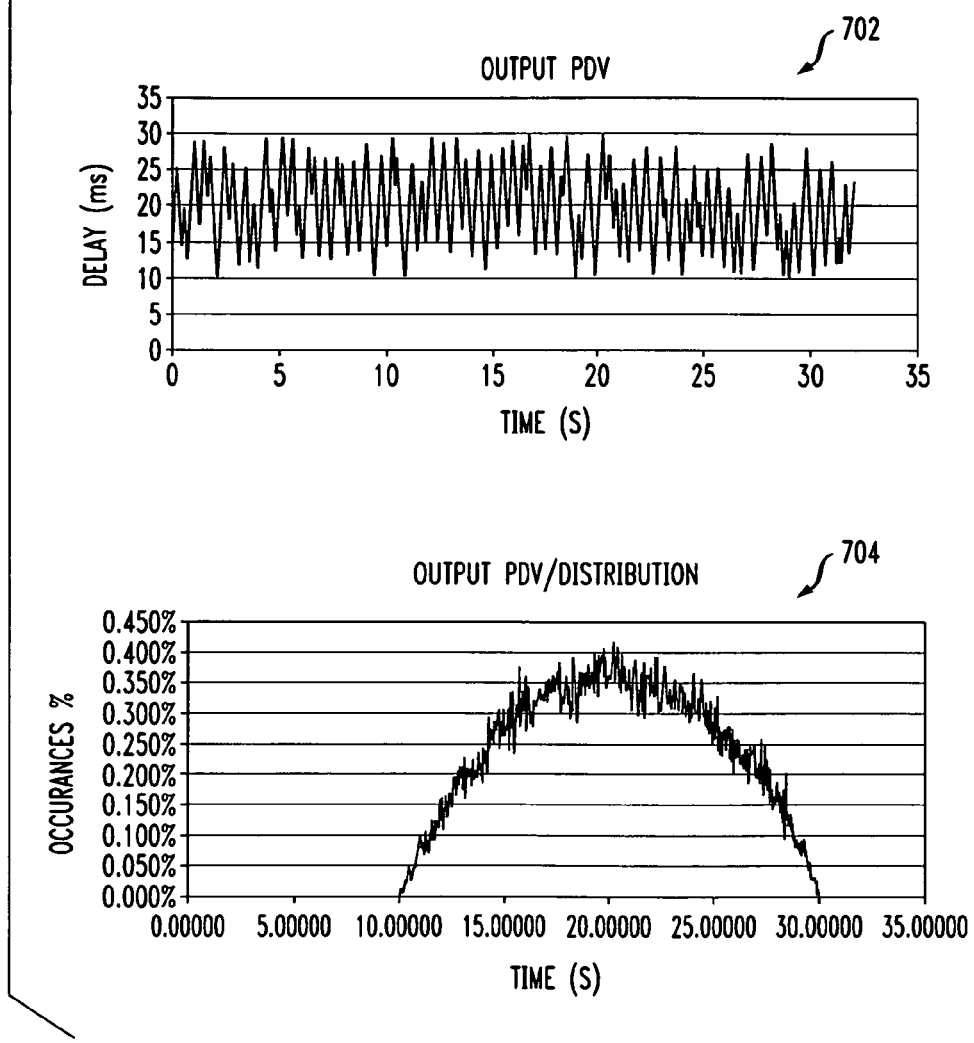
FIG. 7 illustrates PDV generation using variable delay-steps based on uniform PDV delay targets.

FIG. 7 illustrates PDV generation using variable delay-steps. The graphs of FIG. 7 show the actual PDV as seen by the packet receiver 106. Graph 702 shows the PDV displayed over time, and graph 704 shows the PDF histogram of these delays. The delay-step changes that the packets have experienced are uniformly variable between a ±100 µs range. As illustrated in graph 704, it is clear that the PDF distribution of the output PDV is not uniformly distributed. The reason for this is that when the phase changes in relatively small step sizes (compared to the total delay variation range), it tends to spend the majority of the time reaching the target and less time at the target. This accounts for the bulge of the delay samples around the mean of the uniform distribution and fewer delay samples at the extremes.

Figure 8:
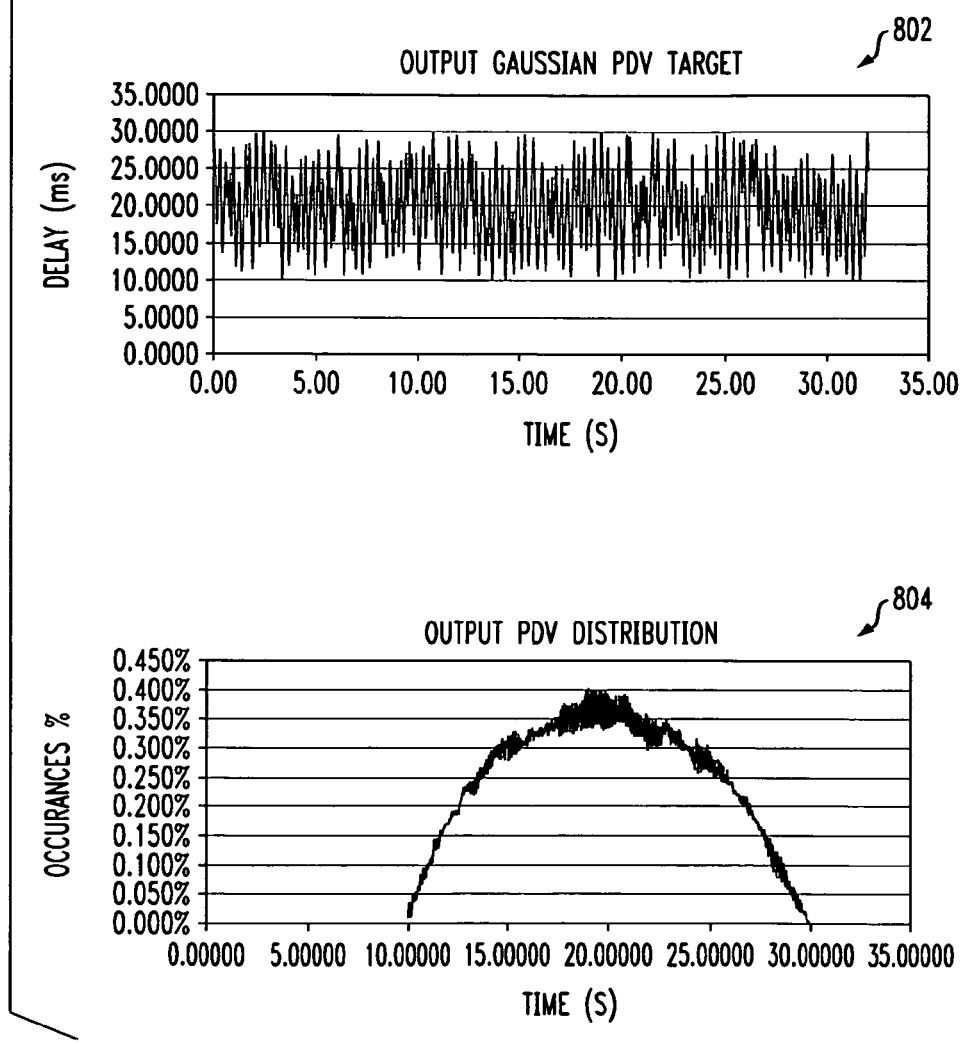
FIG. 8 illustrates PDV generation using fixed delay-steps based on uniform PDV delay targets.

FIG. 8 illustrates PDV generation using fixed delay-steps. The graphs of FIG. 8 show the actual PDV as seen by the packet receiver 106. Graph 802 shows the PDV displayed over time, and graph 804 shows the PDF histogram of these delays. The delay-step changes that these packets have experienced are typically fixed between a ±100 μs range. As illustrated in graph 804, it is clear that the PDF distribution of the output PDV is not uniformly distributed. Accordingly, it can be concluded that the use of small step sizes (fixed or variable) to achieve a target with a uniform PDF will not result in an output PDF that is uniform.

Figure 9:
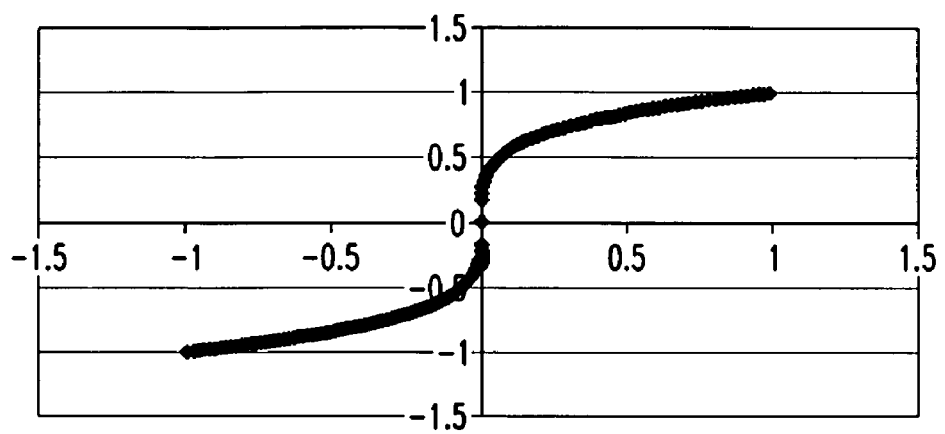
FIG. 9 illustrates a pre-bias transfer function according to an embodiment of the present invention.

As shown in FIGS. 7 and 8, it is evident that regardless of the delay-step type (fixed or variable), a uniform PDF will not be output if a uniform PDF target is used. However, if the PDF target is pre-biased with a PDF that is the inverse of those shown in FIGS. 7 and 8, then a generally uniform PDF will result. FIG. 9 illustrates an example of a pre-bias transfer function that can be used to create a uniform distribution according to an embodiment of the present invention. This distribution is based on the Nth root of the uniformly distributed random value (between +1 and −1). The pre-biased delay and its association with the actual output PDV are described by the following equations:

$$\text{For } U(t) \geq 0, B_D(t) = \sqrt[N]{U(t)}$$

$$\text{For } U(t) \leq 0, B_D(t) = -1 \times \sqrt[N]{|U(t)|}$$

$$D_{total}(t) = D_{MIN} + B_D(t) \times (D_{MAX} - D_{MIN})$$

where $B_D(t)$ is the pre-bias PDF, $U(t)$ is a uniformly generated random number between +1 and −1, N is a root power of the pre-bias PDF, $D_{total}(t)$ is a total delay experienced by a packet, $D_{MAX}$ is the maximum delay, and $D_{MIN}$ is the minimum delay. FIG. 9 shows a pre-bias transfer function with N=5.

Figure 10:
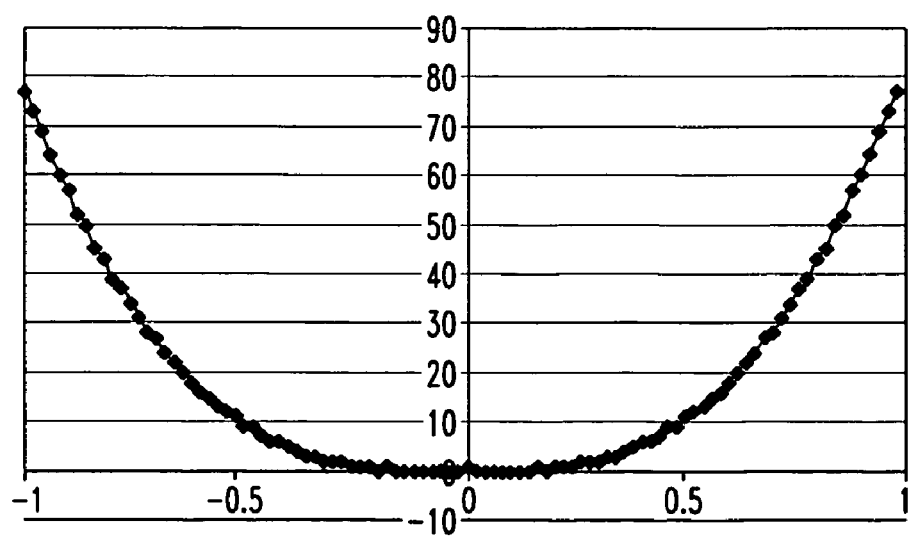
FIG. 10 illustrates a PDF obtained by pre-biasing a uniform distribution with the pre-bias transfer function of FIG. 9.

The pre-bias transfer function effectively increases the value of small delay targets while keeping the large delay target values the same. This leads to a greater number of delay values at the extreme range of the delay distribution. By increasing the value of N, more target delay values are pushed to the extreme delay range, thus allowing the PDF to be adjustable. FIG. 10 illustrates a PDF obtained by pre-biasing a uniform distribution with the pre-bias transfer function of FIG. 9. The PDF of FIG. 10 is obtained using a uniform distribution from +1 to −1 and the pre-bias transfer function of FIG. 9 (N=5). The PDF distribution of FIG. 10 can be used as the basis for random delay target selection in the delay-step method.

Figure 11:
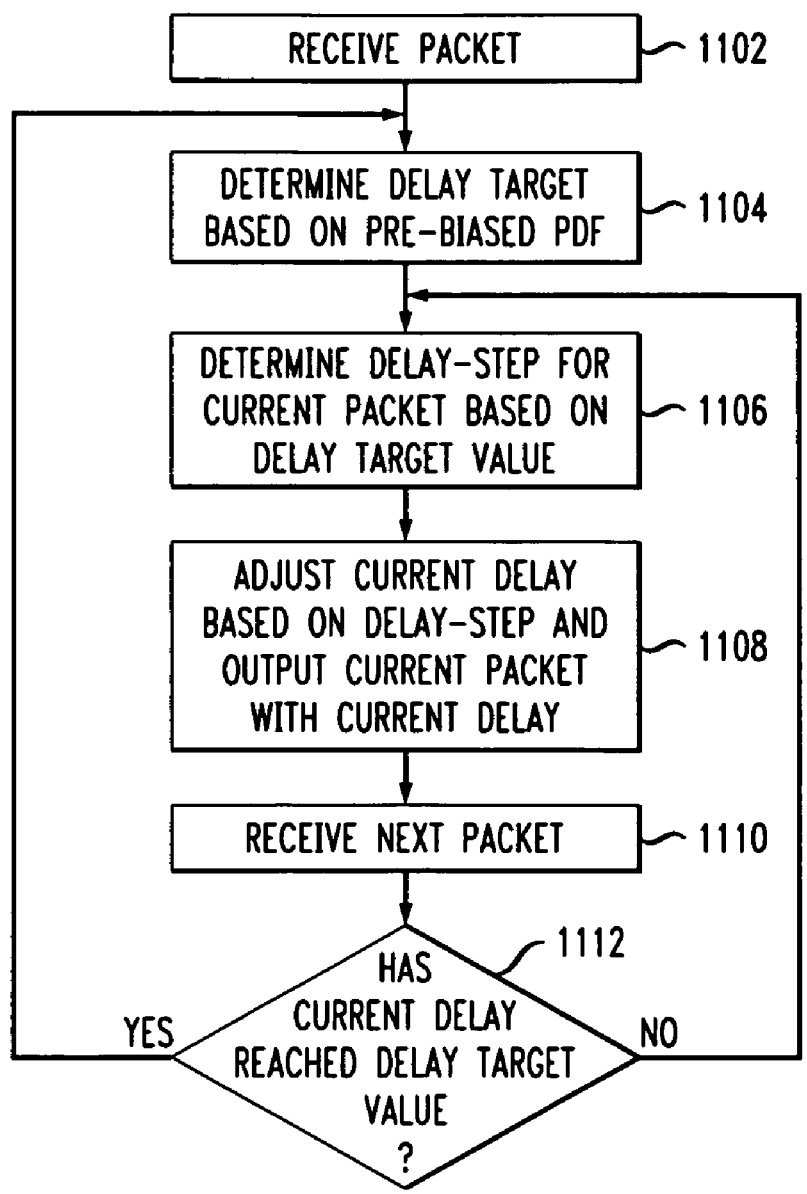
FIG. 11 illustrates a delay-step method for generating PDV having a uniform distribution according to an embodiment of the present invention.

FIG. 11 illustrates a delay-step method for generating PDV having a uniform distribution according to an embodiment of the present invention. The method of FIG. 11 can be performed by the PDV generator 104 of FIG. 1. At step 1102, a packet is received at the PDV generator 104 from the packet generator 102. As described above, the packet generator generates packets at regular intervals and transmits the packets in a stream to the PDV generator 104.

At step 1104, a delay target values is randomly determined based on the pre-biased PDF. For example, the PDV generator 104 can select random Gamma delay target values that fit the PDF curve shown in FIG. 10. The pre-biased PDF is a uniform PDF that is pre-biased by a pre-bias transfer function which increases the value of small delay values, as described above. The pre-biased transfer function can be implemented as an Nth root square filter, and the degree of flatness of the pre-biased PDF can be adjusted by adjusting the value of N.

At step 1106, delay-steps are determined for a series of packets based on the delay target value. The delay-steps are adjustments to a current delay value in order to change the current delay value in a direction towards the delay target value. The current delay is adjusted by the delay-step determined for each packet until the delay of one of the packets is equal to the delay target value. As described above, the delay-steps can be calculated using a variable step size or a fixed step size according to various embodiments of the present invention.

At step 1108, the current delay for the current packet is adjusted by the delay-step determined for the packet to determine a delay for the packet, and the packet is transmitted with the delay determined for that packet from the PDV generator 104 to the packet receiver 106.

At step 1110, a next packet is received at the PDV generator 102 from the packet generator 102. As described above, the packet generator 104 generates the packets at regular intervals.

At step 1112, it is determined whether the current delay has reached the delay target value. If the current delay has not reached the delay target value, the delay target value is maintained and the method returns to step 1106 and determines a delay-step for the current packet based on the delay target value. If the current delay has reached the delay target value, the method returns to step 1104 and randomly determines a new delay target value based on the pre-biased PDF. Accordingly, the method repeatedly calculates delay-steps for subsequent packets based on one delay target value until the delay of a packet reaches that delay target value, then determines a new delay target value and determines delay-steps for subsequent packets to sequentially adjust the delay to the new delay target value. This method is repeated for all of the packets in a sample set.

Figure 12:
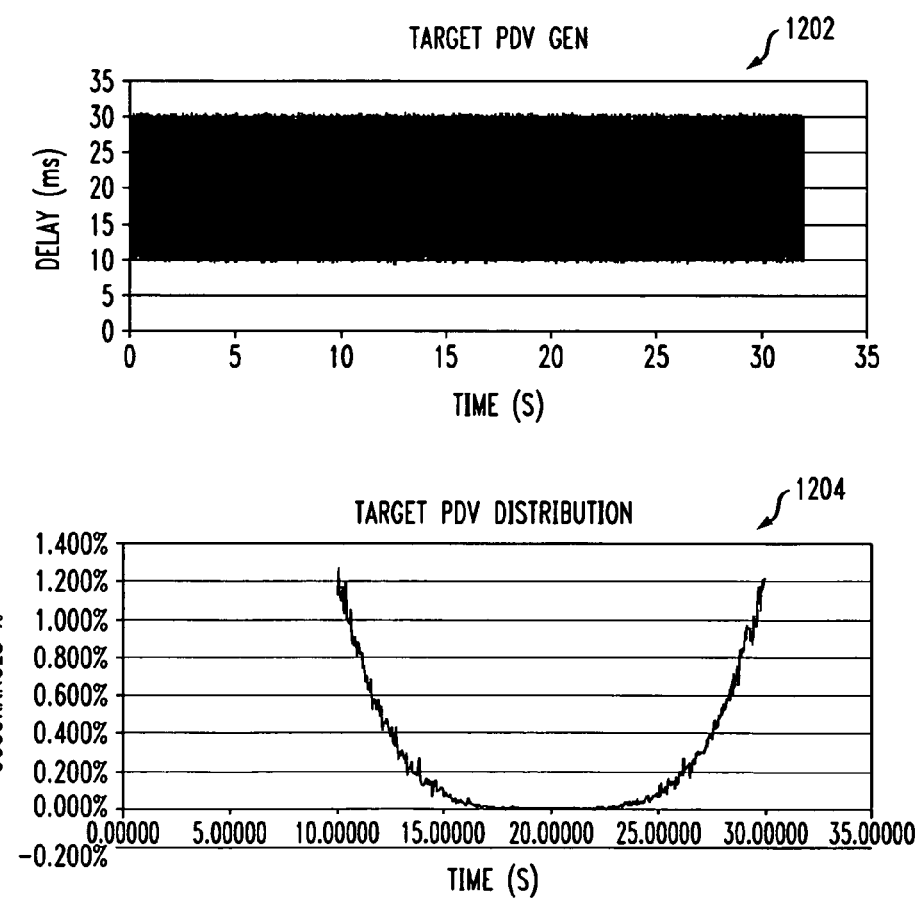
FIGS. 12 and 13 illustrate pre-biased PDV delay target generation.

FIG. 12 illustrates pre-biased PDV delay target generation. The graphs of FIG. 12 are based on the pre-biased transfer function where N=5. Graph 1202 shows the random pre-biased PDV delay targets displayed over time, and graph 1204 shows a PDF histogram for the random pre-biased PDV delay target distribution. The delay target values in graphs 1202 and 1204 include both the $D_p(t)$ and $D_{fixed}$ delay components. As illustrated in graphs 802 and 804, the delay target distribution accurately reflects the pre-bias PDF shown in FIG. 9.

Figure 13:
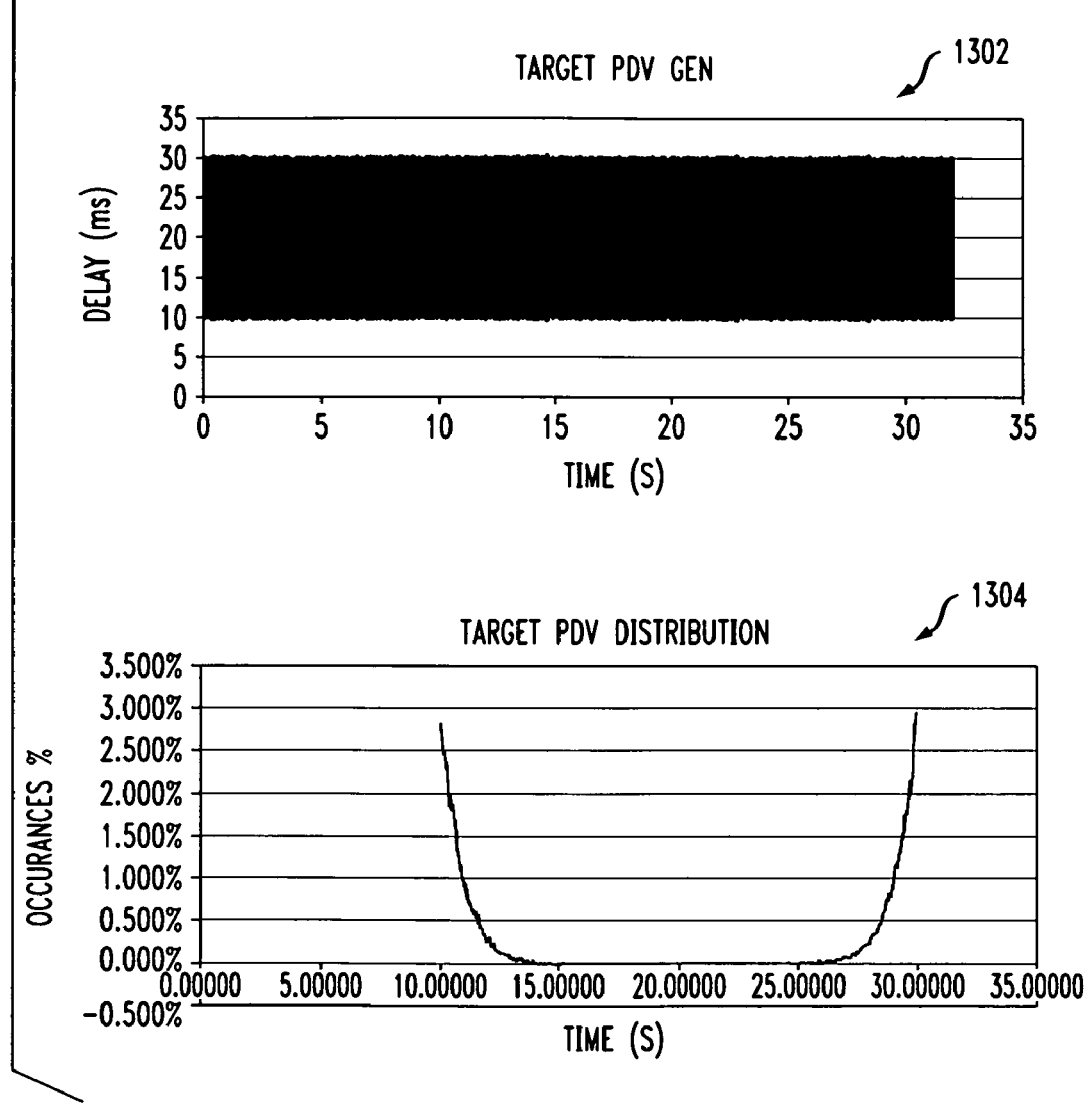

FIG. 13 illustrates the pre-biased PDV delay target generation based on a pre-biased transfer function with N=12. Graph 1302 shows the random pre-biased PDV delay targets displayed over time, and graph 1304 shows a PDF histogram for the random pre-biased PDV delay target distribution. Comparing graph 1304 in FIG. 13 to graph 1204 in FIG. 12, it can be seen that a great value for N results in a flatter PDF distribution for the delay target values.

Figure 14:
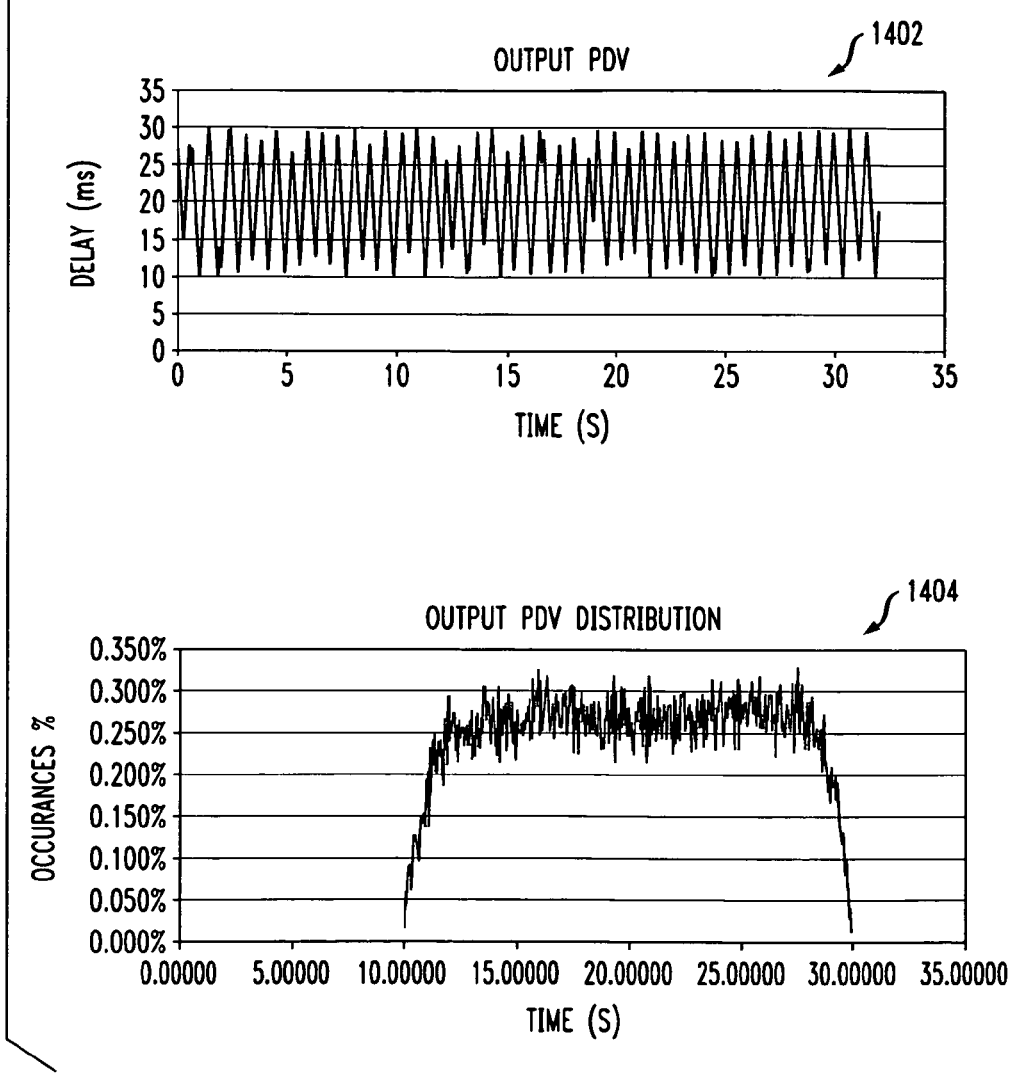
FIGS. 14 and 15 illustrate PDV generation using variable delay-steps based on pre-biased delay step targets.
Figure 15:
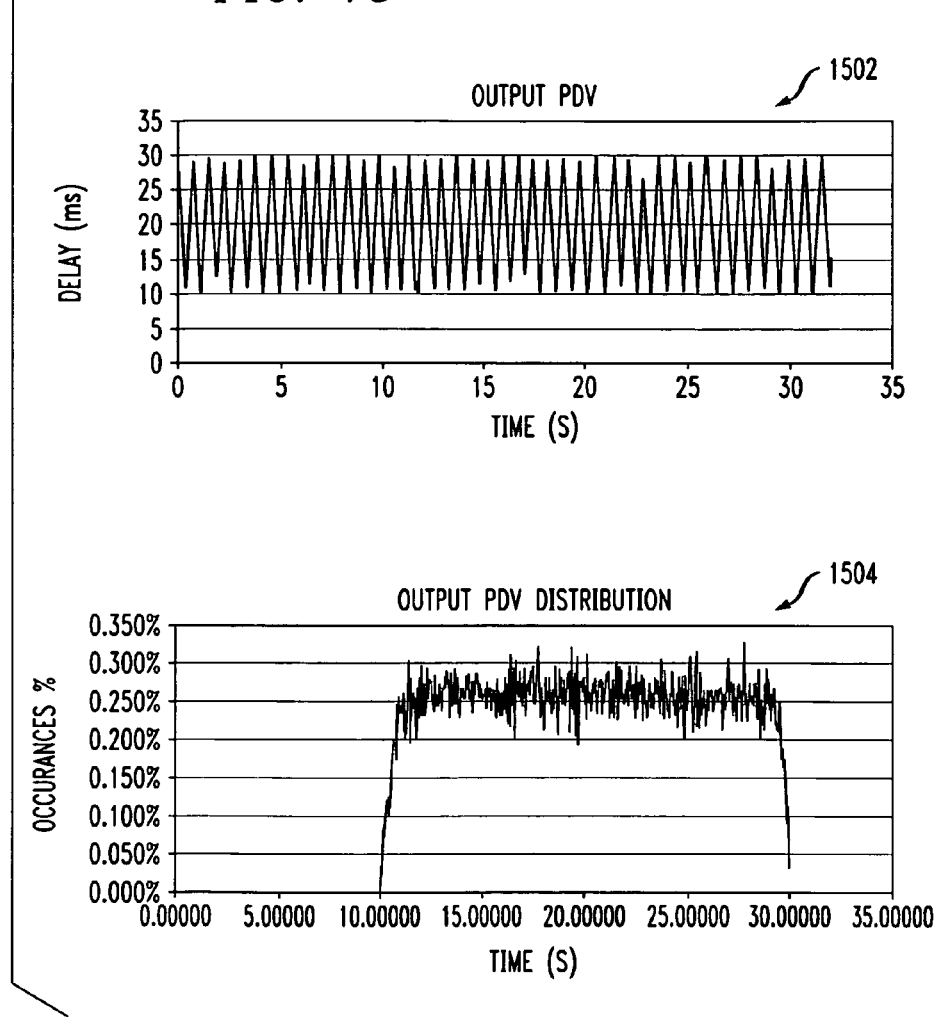

FIGS. 14 and 15 illustrate PDV generation using variable delay-steps based on delay target values determined using pre-biased PDFs with N=5 and N=12, respectively. The graphs of FIGS. 14 and 15 show the actual PDV as seen by the packet receiver 106. Referring to FIG. 14, graph 1402 shows the PDV displayed over time, and graph 1404 shows the PDF histogram of these delays. By comparing graphs 1402 and 1404 with graphs 702 and 704 of FIG. 7, it can be seen the use of the pre-bias transfer function results in a more uniform PDF. The distribution shown in 1404 is relatively flat from approximately 12.4 ms to 27 ms. Beyond this range the distribution tends to fall of. By increasing the value of N, the delay values at the extreme range occur more frequently.

Referring to FIG. 15, graph 1502 shows the PDV displayed over time, and graph 1504 shows the PDF histogram of these delays. Graph 1504 shows that the uniformity of the PDV distribution can be improved by increasing the value of N. As illustrated in graph 1504, the distribution is relatively flat from approximately 11 ms to 29 ms. Although higher values of N will further result in a slightly greater uniform range, the target range may be extended beyond the delay range of interest in order to ensure a uniform distribution over the delay range of interest.

Figure 16:
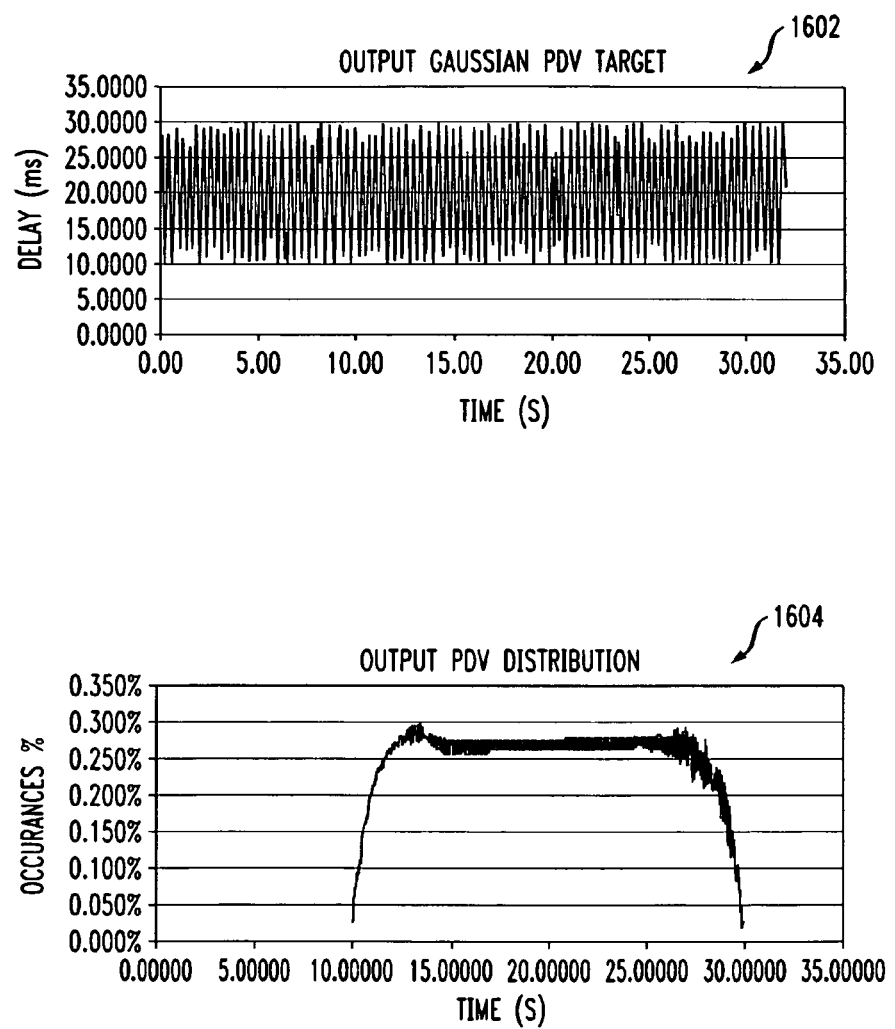
FIGS. 16 and 17 illustrate PDV generation using fixed delay-steps based on pre-biased delay target values.
Figure 17:
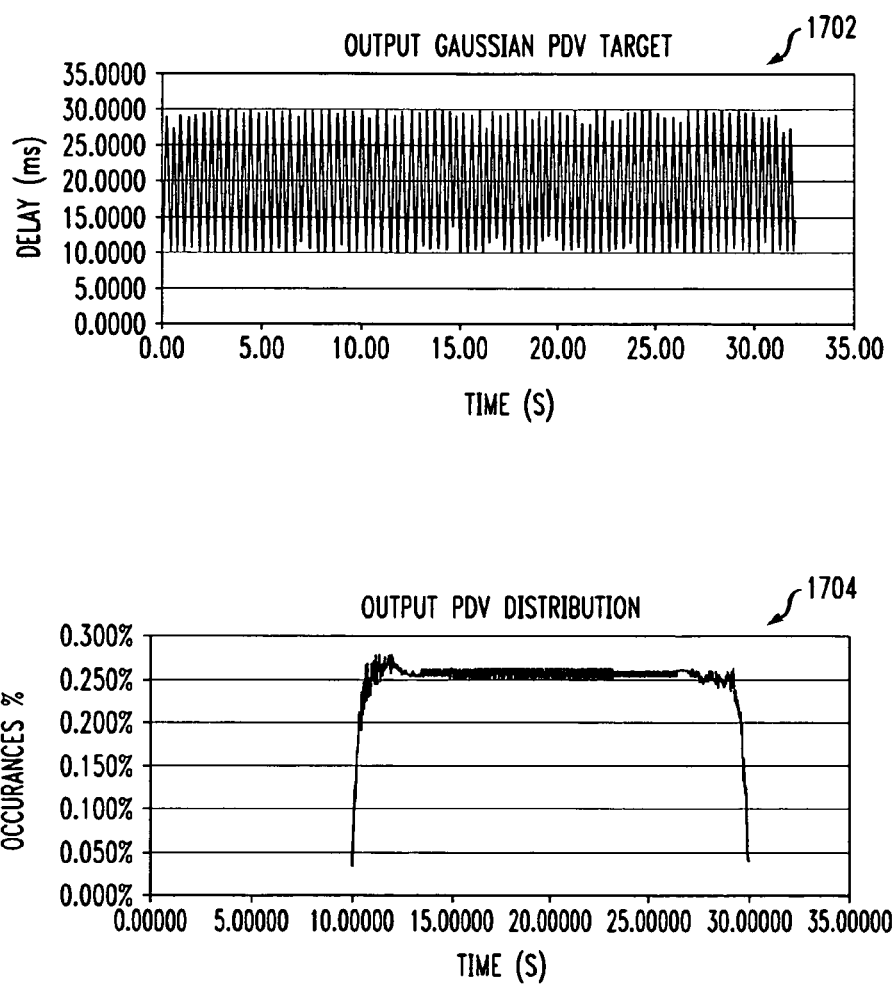

FIGS. 16 and 17 illustrate PDV generation using fixed delay-steps based on delay target values determined using pre-biased PDFs with N=5 and N=12, respectively. The graphs of FIGS. 16 and 17 show the actual PDV as seen by the packet receiver 106. Referring to FIG. 16, graph 1602 shows the PDV displayed over time, and graph 1604 shows the PDF histogram of these delays. By comparing graphs 1602 and 1604 with graphs 802 and 804 of FIG. 8, it can be seen the use of the pre-bias transfer function results in a more uniform PDF. The distribution shown in 1404 is relatively flat from approximately 12.5 ms to 28 ms. This performance is similar to the variable delay-step case shown in FIG. 14. Referring to FIG. 17, graph 1702 shows the PDV displayed over time, and graph 1704 shows the PDF histogram of these delays. Graph 1704 shows that the uniformity of the PDV distribution can be improved by increasing the value of N. As illustrated in graph 1704, the distribution is relatively flat from approximately 10.8 ms to 29.4 ms. This performance is similar to the variable delay-step case shown in FIG. 15.

Figure 18:
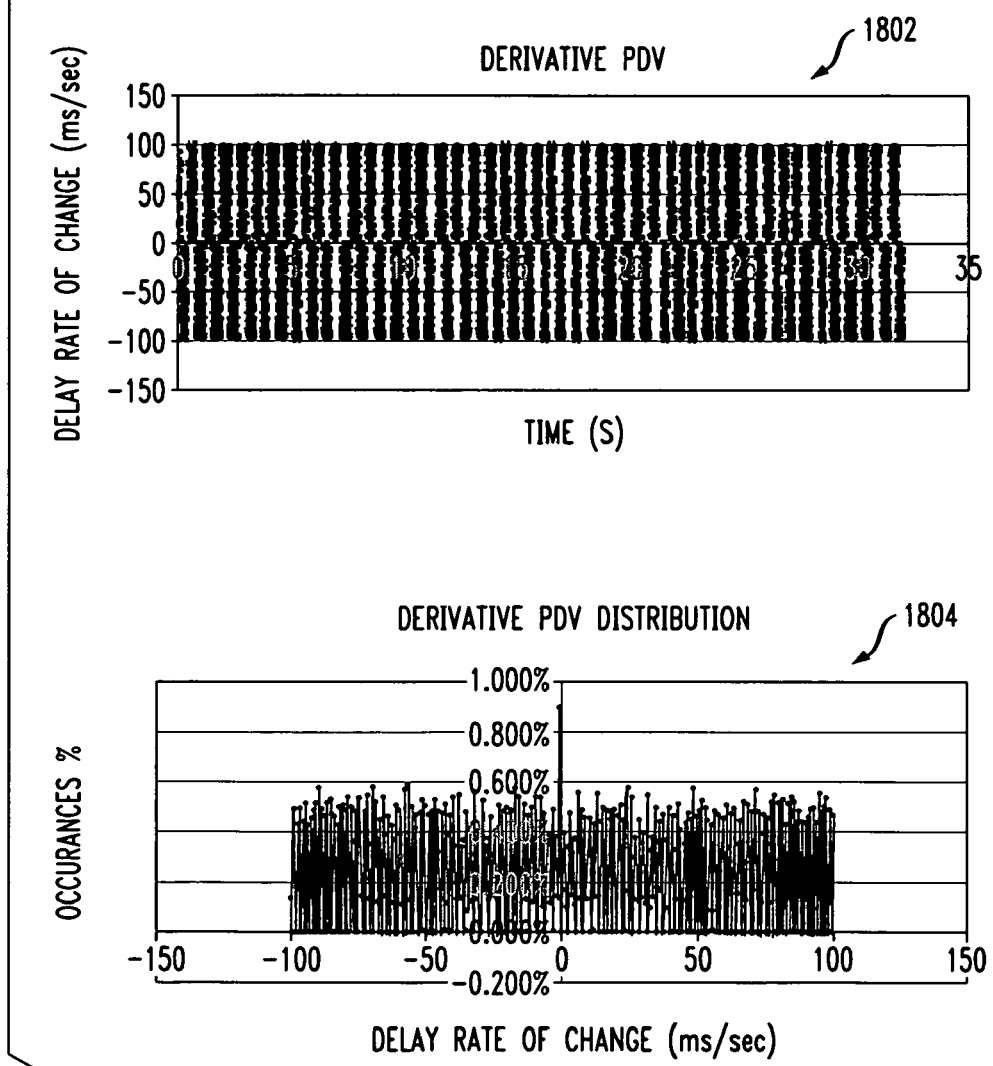
Figure 19:
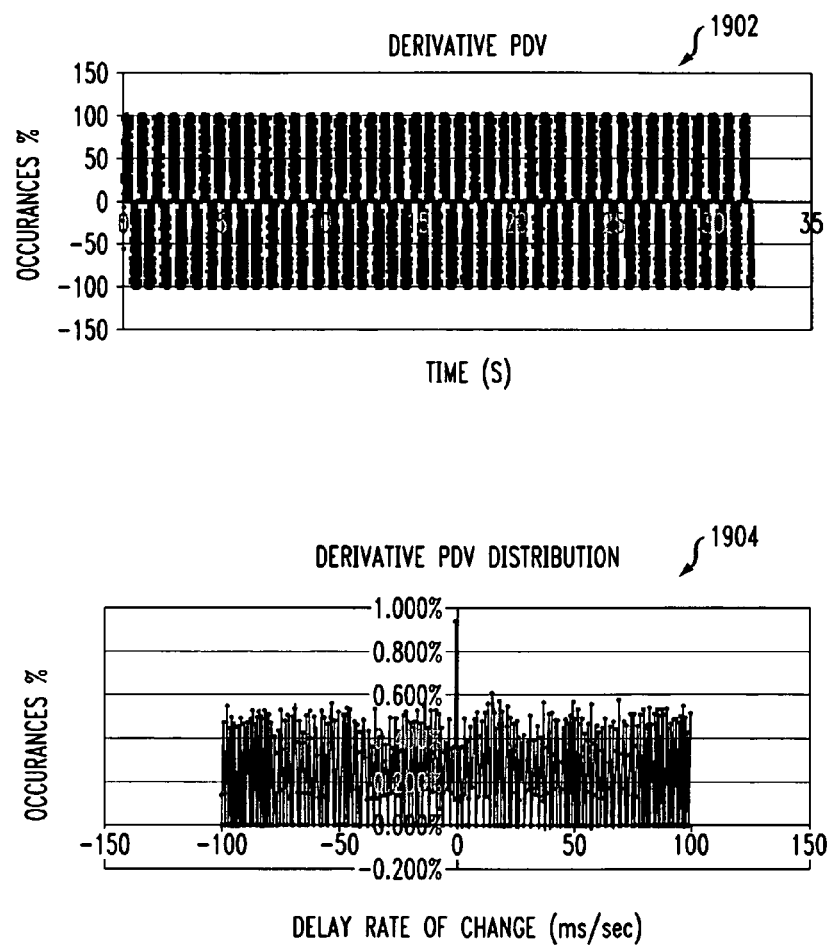

FIGS. 18 and 19 illustrate derivative PDV using variable delay-steps for N=5 case and the N=15 case, respectively. The graphs of FIGS. 18 and 19 show the derivative PDV as seen by the packet receiver 106. The derivative PDV shows the delay rate of change on a packet-by-packet basis. Referring to FIG. 18, graph 1802 shows the derivative PDV displayed over time, and graph 1804 shows the PDF histogram for the derivative PDV for the variable delay-step case with N=5. As illustrated in graphs 1802 and 1804, it can be seen that the delay rate of change (derivative PDV) is bounded between ±100 ms/sec. If the periodic packet rate is known (1000 packet per second in this case), then the derivative PDV bound may be divided by the packet rate to yield the minimum and maximum packet delay-step size (100 μs in this case). Based on the histogram analysis shown in graph 1804, it can be seen that the majority of the distribution is uniformly distributed across this range. There is a slight spike at 0 ms/sec, indicating a tendency for packet delays to remain constant between consecutive packets. Referring to FIG. 19, graph 1902 shows the derivative PDV displayed over time, and graph 1904 shows the PDF histogram for the derivative PDV for the variable delay-step case with N=12. Graphs 1902 and 1904 of FIG. 19 show similar results to graphs 1802 and 1804 of FIG. 18. Accordingly, the increases value of N, which results in a flatter PDF, seems to have no significant impact to the derivative PDV of the distribution.

Figure 20:
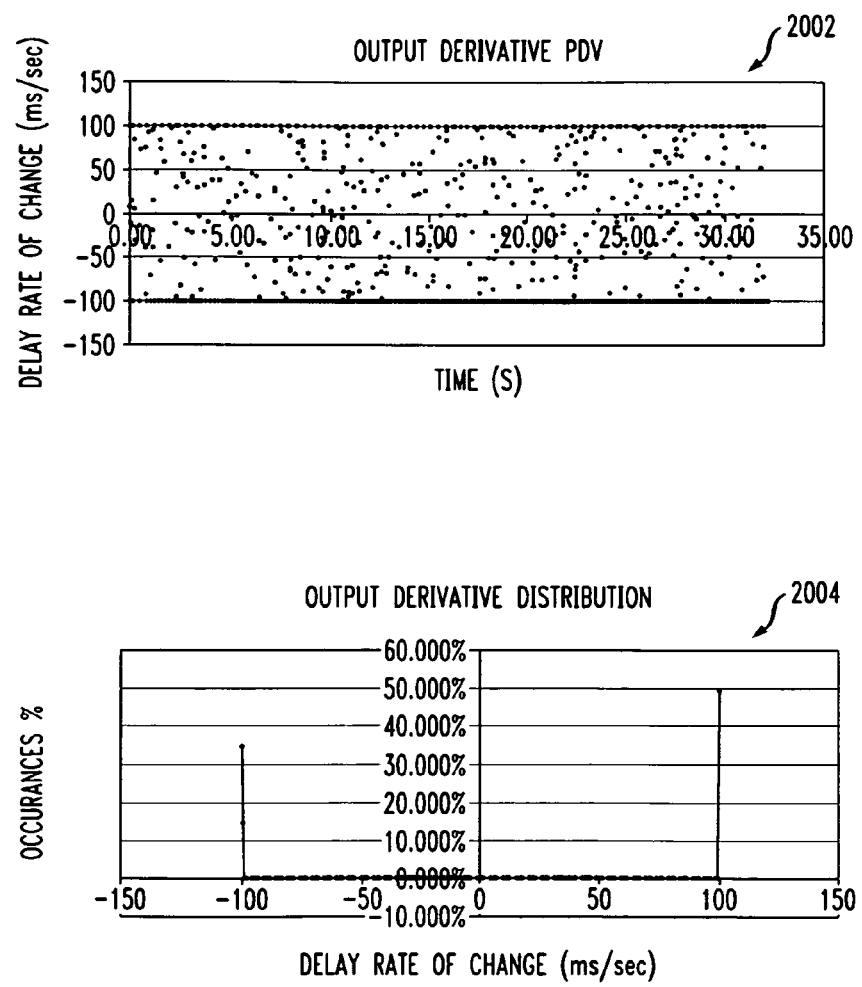
FIGS. 20 and 21 illustrate derivative PDV using fixed delay-steps based on pre-biased delay target values.
Figure 21:
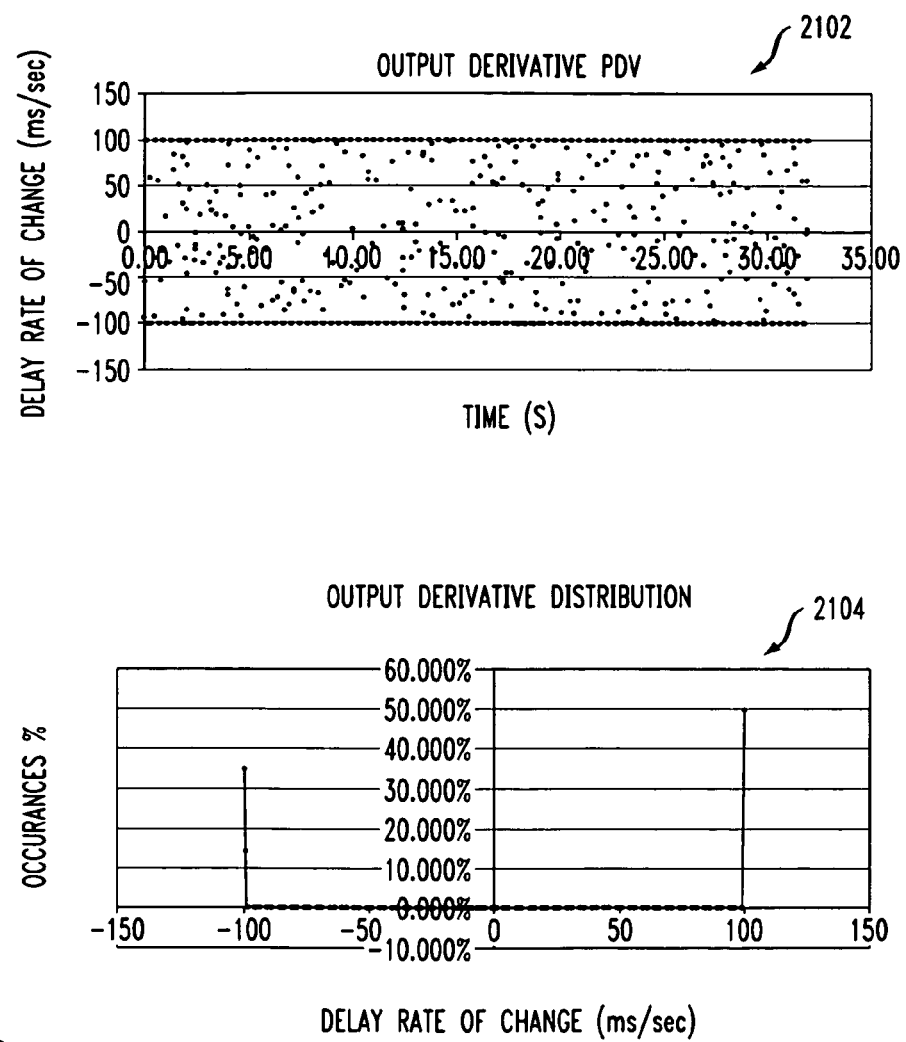

FIGS. 20 and 21 illustrate derivative PDV using fixed delay-steps for N=5 case and the N=15 case, respectively. The graphs of FIGS. 20 and 21 show the derivative PDV as seen by the packet receiver 106. Referring to FIG. 20, graph 2002 shows the derivative PDV displayed over time, and graph 2004 shows the PDF histogram for the derivative PDV for the fixed delay-step case with N=5. As illustrated in graphs 2002 and 2004, it can be seen that the majority of the step delays are at either end of the min/max step range. This is also verified by the PDF histogram shown in graph 2004, which shows approximately 90% of the delay-step change values are equally divided between the min and max step values. Referring to FIG. 21, graph 2102 shows the derivative PDV displayed over time, and graph 2104 shows the PDF histogram for the derivative PDV for the fixed delay-step case with N=12. Graphs 2102 and 2104 of FIG. 21 show similar results to graphs 2002 and 2004 of FIG. 20.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating packet delay variation (PDV) with a uniformly distributed probability density function (PDF) for packet timing recovery stress testing of a network, comprising:

receiving, by a PDV generator, a stream of packets, each packet generated at a regular interval by a packet generator;

determining, by the PDV generator, a delay for each packet based on delay target values determined based on a pre-biased PDF comprising a uniform PDF that is pre-biased with a pre-bias transfer function; and transmitting, by the PDV generator, each packet over the network with the delay determined for that packet, wherein, for a uniformly distributed random number greater than or equal to zero, the pre-bias transfer function is based on an Nth root of the uniformly distributed random number, and for a uniformly distributed random number less than zero, the pre-bias transfer function is based on a negative of the Nth root of an absolute value of the uniformly distributed random number.

2. The method of claim 1, wherein the pre-bias transfer function generates delay targets at extremes of the uniform PDF.

3. The method of claim 1, wherein the pre-bias transfer function is an Nth root square filter.

4. The method of claim 3, wherein a flatness of the PDV is adjustable based on a value of N.

5. The method of claim 1, wherein the pre-bias transfer function is given by:

$$\text{For } U(t) \geq 0, B_D(t) = \sqrt[N]{U(t)}$$
$$\text{For } U(t) < 0, B_D(t) = -1 \times \sqrt[N]{|U(t)|},$$

and the pre-biased PDF is given by:

$$D_{total}(t) = D_{MIN} + B_D(t) \times (D_{MAX} - D_{MIN}),$$

where $B_D(t)$ is the pre-bias transfer function, $U(t)$ is a uniformly generated random number between +1 and −1, N is a root power of the pre-bias transfer function, $D_{total}(t)$ is a total delay experienced by a packet, $D_{MAX}$ is a maximum delay, and $D_{MIN}$ is a minimum delay.

6. The method of claim 1, wherein said step of determining a delay for each packet comprises:

(a) selecting a random delay target value based on said pre-biased PDF;

(b) adjusting the delay of sequential packets in said stream of packets by delay-steps determined based on the random delay target value, until the delay of packet is equal to the random delay target value; and (c) repeating steps (a) and (b) to determine a delay value for each packet in said stream of packets.

7. The method of claim 6, wherein step (b) comprises for each of said sequential packets:
   determining a difference between a current delay for the packet and the random delay target value;
   if the difference between the current delay for the packet and the random delay target value is negative, adjusting the current delay for the packet by a delay-step determined as a uniformly distributed value between 0 and a maximum step size; and
   if the difference between the current delay for the packet and the random delay target value is positive, adjusting the current delay for the packet by a delay-step determined as a uniformly distributed value between a minimum step size and 0.

8. The method of claim 6, wherein step (b) comprises for each of said sequential packets:
   determining a difference between a current delay for the packet and the random delay target value;
   if the difference between the current delay for the packet and the random delay target value is negative, adjusting the current delay for the packet by a fixed positive delay-step; and
   if the difference between the current delay for the packet and the random delay target value is positive, adjusting the current delay for the packet by a fixed negative delay-step.

9. A system for generating packet delay variation (PDV) with a uniformly distributed probability density function (PDF) for packet timing recovery stress testing of a network, comprising:
   means for generating a stream of packets, each packet generated at a regular interval;
   means for determining a delay for each packet based on delay target values determined based on a pre-biased PDF comprising a uniform PDF that is pre-biased with a pre-bias transfer function; and
   means for transmitting each packet on the network with the delay determined for that packet,
   wherein, for a uniformly distributed random number greater than or equal to zero, the pre-bias transfer function is based on an Nth root of the uniformly distributed random number, and for a uniformly distributed random number less than zero, the pre-bias transfer function is based on a negative of the Nth root of an absolute value of the uniformly distributed random number.

10. The system of claim 9, wherein the pre-bias transfer function generates delay target values at extremes of the uniform PDF.

11. The system of claim 9, wherein the pre-bias transfer function is an Nth root square filter.

12. The system of claim 11, wherein a flatness of the PDV is adjustable based on a value of N.

13. The system of claim 9, wherein the pre-bias transfer function is given by:

$$\text{For } U(t) \geq 0, B_D(t) = \sqrt[N]{U(t)}$$
$$\text{For } U(t) < 0, B_D(t) = -1 \times \sqrt[N]{|U(t)|},$$

and the pre-biased PDF is given by:

$$D_{total}(t) = D_{MIN} + B_D \times (D_{MAX} - D_{MIN}),$$

where $B_D(t)$ is the pre-bias transfer function, $U(t)$ is a uniformly generated random number between +1 and −1, N is a root power of the pre-bias transfer function, $D_{total}(t)$ is a total delay experienced by a packet, $D_{MAX}$ is a maximum delay, and $D_{MIN}$ is a minimum delay.

14. The system of claim 10, wherein said step of determining a delay for each packet comprises:
   means for selecting a random delay target value based on said pre-biased PDF; and
   means for adjusting the delay of sequential packets in said stream of packets by delay-steps determined based on the random delay target value, until the delay of packet is equal to the random delay target value.

15. The system of claim 14, wherein said means for adjusting comprises:
   means for determining a difference between a current delay for the packet and the random delay target value; and
   means for adjusting the current delay for the packet by a delay-step determined as a uniformly distributed value between a minimum step size and a maximum step size based on the difference between the current delay for the packet and the random delay target value.

16. The system of claim 14, wherein said means for adjusting comprises:
   means for determining a difference between a current delay for the packet and the random delay target value; and
   means for adjusting the current delay for the packet by one of a fixed positive delay-step and a fixed negative delay-step based on the difference between the current delay for the packet and the random delay target value.

17. A non-transitory computer readable medium storing computer executable instructions for generating packet delay variation (PDV) with a uniformly distributed probability density function (PDF) for packet timing recovery stress testing of a network, said computer executable instructions defining steps comprising:
   receiving a stream of packets, each packet generated at a regular interval;
   determining a delay for each packet based on delay target values determined based on a pre-biased PDF comprising a uniform PDF that is pre-biased with a pre-bias transfer function; and
   transmitting each packet on the network with the delay determined for that packet,
   wherein, for a uniformly distributed random number greater than or equal to zero, the pre-bias transfer function is based on an Nth root of the uniformly distributed random number, and for a uniformly distributed random number less than zero, the pre-bias transfer function is based on a negative of the Nth root of an absolute value of the uniformly distributed random number.

18. The non-transitory computer readable medium of claim 17, wherein the pre-bias transfer function generates delay targets at extremes of the uniform PDF.

19. The non-transitory computer readable medium of claim 17, wherein the pre-bias transfer function is an Nth root square filter.

20. The non-transitory computer readable medium of claim 19, wherein a flatness of the PDV is adjustable based on a value of N.

21. The non-transitory computer readable medium of claim 17, wherein the pre-bias transfer function is given by:

$$\text{For } U(t) \geq 0, B_D(t) = \sqrt[N]{U(t)}$$
$$\text{For } U(t) < 0, B_D(t) = -1 \times \sqrt[N]{|U(t)|},$$

and the pre-biased PDF is given by:

$$D_{total}(t) = D_{MIN} + B_D(t) \times (D_{MAX} - D_{MIN}),$$

where $B_D(t)$ is the pre-bias transfer function, $U(t)$ is a uniformly generated random number between +1 and −1, N is a root power of the pre-bias transfer function, $D_{total}(t)$ is a total delay experienced by a packet, $D_{MAX}$ is a maximum delay, and $D_{MIN}$ is a minimum delay.

22. The non-transitory computer readable medium of claim 17, wherein said step of determining a delay for each packet comprises:
(a) selecting a random delay target value based on said pre-biased PDF;
(b) adjusting the delay of sequential packets in said stream of packets by delay-steps determined based on the random delay target value, until the delay of packet is equal to the random delay target value; and
(c) repeating steps (a) and (b) to determine a delay value for each packet in said stream of packets.

23. The non-transitory computer readable medium of claim 22, wherein step (b) comprises for each of said sequential packets:
determining a difference between a current delay for the packet and the random delay target value;
if the difference between the current delay for the packet and the random delay target value is negative, adjusting the current delay for the packet by a delay-step determined as a uniformly distributed value between 0 and a maximum step size; and
if the difference between the current delay for the packet and the random delay target value is positive, adjusting the current delay for the packet by a delay-step determined as a uniformly distributed value between a minimum step size and 0.

24. The non-transitory computer readable medium of claim 22, wherein step (b) comprises for each of said sequential packets:
determining a difference between a current delay for the packet and the random delay target value;
if the difference between the current delay for the packet and the random delay target value is negative, adjusting the current delay for the packet by a fixed positive delay-step; and
if the difference between the current delay for the packet and the random delay target value is positive, adjusting the current delay for the packet by a fixed negative delay-step.

25. A method for generating packet delay variation (PDV) with a uniformly distributed probability density function (PDF) for packet timing recovery stress testing of a network, comprising:
receiving, by a PDV generator, a stream of packets, each packet generated at a regular interval by a packet generator;
determining, by the PDV generator, a delay for each packet based on delay target values determined based on a pre-biased PDF comprising a uniform PDF that is pre-biased with a pre-bias transfer function; and
transmitting, by the PDV generator, each packet over the network with the delay determined for that packet,
wherein the pre-bias transfer function is given by:

$$\text{For } U(t) \geq 0, B_D(t) = \sqrt[N]{U(t)}$$
$$\text{For } U(t) < 0, B_D(t) = -1 \times \sqrt[N]{|U(t)|},$$

and the pre-biased PDF is given by:

$$D_{total}(t) = D_{MIN} + B_D(t) \times (D_{MAX} - D_{MIN}),$$

where $B_D(t)$ is the pre-bias transfer function, UN is a uniformly generated random number between +1 and −1, N is a root power of the pre-bias transfer function, $D_{total}(t)$ is a total delay experienced by a packet, $D_{MAX}$ is a maximum delay, and $D_{MIN}$ is a minimum delay.

26. A system for generating packet delay variation (PDV) with a uniformly distributed probability density function (PDF) for packet timing recovery stress testing, comprising:
means for generating a stream of packets, each packet generated at a regular interval;
means for determining a delay for each packet based on delay target values determined based on a pre-biased PDF comprising a uniform PDF that is pre-biased with a pre-bias transfer function; and
means for transmitting each packet with the delay determined for that packet,
wherein the pre-bias transfer function is given by:

$$\text{For } U(t) \geq 0, B_D(t) = \sqrt[N]{U(t)}$$
$$\text{For } U(t) < 0, B_D(t) = -1 \times \sqrt[N]{|U(t)|},$$

and the pre-biased PDF is given by:
$D_{total}(t) = D_{MIN} + B_D(t) \times (D_{MAX} - D_{MIN}),$
where $B_D(t)$ is the pre-bias transfer function, $U(t)$ is a uniformly generated random number between +1 and −1, N is a root power of the pre-bias transfer function, $D_{total}(t)$ is a total delay experienced by a packet, $D_{MAX}$ is a maximum delay, and $D_{MIN}$ is a minimum delay.

27. A non-transitory computer readable medium storing computer executable instructions for generating packet delay variation (PDV) with a uniformly distributed probability density function (PDF) for packet timing recover stress testing, said computer executable instructions defining steps comprising:
receiving a stream of packets, each packet generated at a regular interval;
determining a delay for each packet based on delay target values determined based on a pre-biased PDF comprising a uniform PDF that is pre-biased with a pre-bias transfer function; and
transmitting each packet with the delay determined for that packet,
wherein the pre-bias transfer function is given by:

$$\text{For } U(t) \geq 0, B_D(t) = \sqrt[N]{U(t)}$$
$$\text{For } U(t) < 0, B_D(t) = -1 \times \sqrt[N]{|U(t)|},$$

and the pre-biased PDF is given by:

$$D_{total}(t) = D_{MIN} + B_D(t) \times (D_{MAX} - D_{MIN}),$$

where $B_D(t)$ is the pre-bias transfer function, $U(t)$ is a uniformly generated random number between +1 and −1, N is a root power of the pre-bias transfer function, $D_{total}(t)$ is a total delay experienced by a packet, $D_{MAX}$ is a maximum delay, and $D_{MIN}$ is a minimum delay.

* * * * *